US012388485B2

(12) United States Patent
Randjelovic et al.

(10) Patent No.: US 12,388,485 B2
(45) Date of Patent: Aug. 12, 2025

(54) ANTENNA DEVICE AND RELATED COMMUNICATION METHOD

(71) Applicant: The Swatch Group Research and Development Ltd, Marin (CH)

(72) Inventors: Zoran Randjelovic, Corcelles (CH); Thierry Scordilis, Cormondrèche (CH)

(73) Assignee: The Swatch Group Research and Development Ltd, Marin (CH)

( * ) Notice: Subject to any disclaimer, the term of this patent is extended or adjusted under 35 U.S.C. 154(b) by 70 days.

(21) Appl. No.: 17/646,895

(22) Filed: Jan. 4, 2022

(65) Prior Publication Data

US 2022/0271789 A1    Aug. 25, 2022

(30) Foreign Application Priority Data

Feb. 23, 2021   (EP) .................................... 21158733

(51) Int. Cl.
*H04B 1/48* (2006.01)
(52) U.S. Cl.
CPC ..................................... *H04B 1/48* (2013.01)
(58) Field of Classification Search
CPC ..... G06K 19/072; G06K 19/0723; H04B 1/48
See application file for complete search history.

(56) References Cited

U.S. PATENT DOCUMENTS

| | | | |
|---|---|---|---|
| 9,396,424 B1 | 7/2016 | Loman et al. | |
| 2015/0294210 A1* | 10/2015 | Martinez de Velasco Cortina | G07B 15/063 235/492 |
| 2016/0180210 A1* | 6/2016 | Spears | G06K 19/07345 235/492 |
| 2018/0267140 A1* | 9/2018 | Corcos | G01S 13/34 |

FOREIGN PATENT DOCUMENTS

| | | |
|---|---|---|
| CN | 105471023 A | 4/2016 |
| CN | 109660642 A | 4/2019 |
| DE | 201 10 585 U1 | 11/2001 |
| JP | 11-191745 A | 7/1999 |
| JP | 2001-283171 A | 10/2001 |
| JP | 2007-257147 A | 10/2007 |
| JP | 2010-67128 A | 3/2010 |

(Continued)

OTHER PUBLICATIONS

European Search Report issued Jul. 28, 2021 in European Application 21158733.2, filed on Feb. 23, 2021, 3 pages (with English Translation of Categories of cited documents).

(Continued)

*Primary Examiner* — Patrick C Chen
(74) *Attorney, Agent, or Firm* — Oblon, McClelland, Maier & Neustadt, L.L.P.

(57) ABSTRACT

A radiocommunication device, configured to implement a communication method, including an antenna for picking up at least one set of electromagnetic waves and/or for radiating at least one first group of data and/or at least one second group of data. The device further includes at least one first radiocommunication circuit, configured to receive at least one set of electromagnetic waves and/or to transmit at least one first group of data, and at least one second radiocommunication circuit, configured to receive at least one set of electromagnetic waves and/or to transmit at least one second group of data.

7 Claims, 1 Drawing Sheet

(56) References Cited

FOREIGN PATENT DOCUMENTS

| | | |
|---|---|---|
| JP | 2011-70321 A | 4/2011 |
| JP | 2015-32957 A | 2/2015 |
| KR | 10-2010-0035378 A | 4/2010 |

OTHER PUBLICATIONS

Japanese Office Action issued on Feb. 7, 2023 in Japanese Patent Application No. 2021-204077 (with English translation), 10 pages.

Wang et.al., "Research of Characteristics of the Near-Field Modulation On-Chip Antenna," Journal of Microwaves, Phase S1. Aug. 15, 2010, (w/ English Abstract).

Chinese Office Action issued in Chinese Patent Application No. 202210161343.0 on Oct. 19, 2023.

\* cited by examiner

ANTENNA DEVICE AND RELATED COMMUNICATION METHOD

CROSS-REFERENCE TO RELATED APPLICATION

This application claims priority to European Patent Application No. 21158733.2 filed on Feb. 23, 2021, the entire disclosure of which is hereby incorporated herein by reference.

TECHNICAL FIELD OF THE INVENTION

The present invention relates to the field of radiocommunication and more particularly the field of short-distance radiocommunications of the RFID or NFC type. More specifically, the present invention relates to the antenna devices, combinations of functions, as well as related communication methods.

TECHNOLOGICAL BACKGROUND

RFID devices or more particularly NFC devices, acronym for Near Field Communication, also known under the name of contactless short-distance communication devices, are devices disposed on or in objects or products so as to allow an identification of said object and/or product by means of electromagnetic waves. These devices comprise an antenna associated with a single electronic chip that allows them to receive and respond to radio requests transmitted from the transceiver.

RFID or NFC devices are increasingly used for making payments, access controls, recharging, etc.

However, electronic chips intended for bank payments, for example, are complex, because of secure operations and in addition subject to numerous regulations, and are not adapted for simple and conventional applications such as access control or new applications such as the WLC, acronym for WireLess Charging, which requires an open and easily accessible platform.

Moreover, it is not even possible to use an electronic banking chip for other applications, because no access is granted to its secure memory except to a restricted community such as that of the banking community, for example.

SUMMARY OF THE INVENTION

The invention relates to a short-distance radiocommunication device comprising an antenna configured to pick up at least one set of electromagnetic waves and/or to radiate at least one first group of data and/or at least one second group of data, and at least one:
 First radiocommunication circuit; said at least one first radiocommunication circuit being configured to receive said at least one set of electromagnetic waves and/or to transmit said at least one first group of data;
 Second radiocommunication circuit; said at least one second radiocommunication circuit being configured to receive said at least one set of electromagnetic waves and/or to transmit said at least one second group of data;
 Said antenna being configured to be connected, preferably directly, to said at least one first radio-communication circuit and to said at least one second radio-communication circuit.

Thanks to this arrangement, the radiocommunication device allows to have two radio-communication circuits connected to an antenna, preferably to a single antenna, which allows to simplify the integration into a product with a small footprint, the manufacturing and assembly methods, and/or to combine at least two radiocommunication circuits into a single RFID or NFC module and at the same time increase the functionality number on a single device. Short-distance radiocommunication device means a radiocommunication device configured to communicate within a radius of a few centimetres to a few metres.

According to one embodiment, said at least one first standard is identical to said at least one second standard.

Thanks to this arrangement, the radio-communication circuit transmits a group of data, which is preferably simultaneous, to the recipient and it is said recipient who will select the group of data appropriate to his request.

According to one embodiment, said at least one first radiocommunication circuit is configured to transmit said at least one first group of data according to at least one first standard and said at least one second radiocommunication circuit is configured to transmit said at least one second group of data according to at least one second standard, preferably said at least one first standard is different from said at least one second standard.

Thanks to this arrangement, the radiocommunication circuit only transmits a group of data when said at least one set of electromagnetic waves corresponds to said at least one first standard and/or to said at least one second standard.

According to one embodiment, said radiocommunication device comprises at least one delay device configured to delay the reception and/or transmission of said at least one set of electromagnetic waves by said at least one first radiocommunication circuit or by said at least one second radiocommunication circuit.

According to one embodiment, said radiocommunication device comprises at least one switch configured to switch the reception of said at least one set of electromagnetic waves between said at least one first radiocommunication circuit and said at least one second radiocommunication circuit.

Thanks to either one of these preceding arrangements, a prioritisation or hierarchisation between said at least one first radiocommunication circuit and by said at least one second radiocommunication circuit is carried out.

According to one embodiment, said antenna consists of a single antenna.

Thanks to this arrangement, the radiocommunication device allows to have two radiocommunication circuits connected to a single antenna, which allows to simplify the manufacturing methods and/or to combine at least two radiocommunication circuits into a single RFID or NFC module.

According to one embodiment, said at least one first standard is an RFID standard or an NFC standard and/or said at least one second standard is an RFID standard or an NFC standard.

The invention relates to a communication method implemented by said radiocommunication device according to the present invention; said communication method comprising:
 Receiving said at least one set of electromagnetic waves;
 Selecting said at least one first radiocommunication circuit and/or said at least one second radiocommunication circuit; and,
 Transmitting said at least one first group of data and/or said at least one second group of data.

Thanks to this arrangement, the radiocommunication device allows to have two radiocommunication circuits communicating with an antenna, preferably a single antenna, which allows to simplify the manufacturing methods and/or to combine at least two radiocommunication circuits into a single RFID or NFC module.

According to one embodiment, said selection is carried out by recognition of said at least one first standard by said at least one first radiocommunication circuit and/or of said at least one second standard by said at least one second radiocommunication circuit.

Thanks to this arrangement, the radiocommunication circuit only transmits a group of data when said at least one set of electromagnetic waves corresponds to said at least one first standard and/or to said at least one second standard.

According to one embodiment, said selection is carried out by delaying said reception of said at least one set of electromagnetic waves by said at least one first radiocommunication circuit or by said at least one second radiocommunication circuit and/or by delaying said transmission of said at least one first group of data and/or of said at least one second group of data.

According to one embodiment, said selection is carried out by switching said reception of said at least one set of electromagnetic waves between said at least one first radiocommunication circuit and said at least one second radiocommunication circuit.

Thanks to either one of these preceding arrangements, a prioritisation or hierarchisation between said at least one first radiocommunication circuit and by said at least one second radiocommunication circuit is carried out.

BRIEF DESCRIPTION OF THE FIGURES

The invention will be described in more detail below using the appended drawings, given by way of non-limiting examples, wherein.

DETAILED DESCRIPTION OF THE INVENTION

Figure 1:
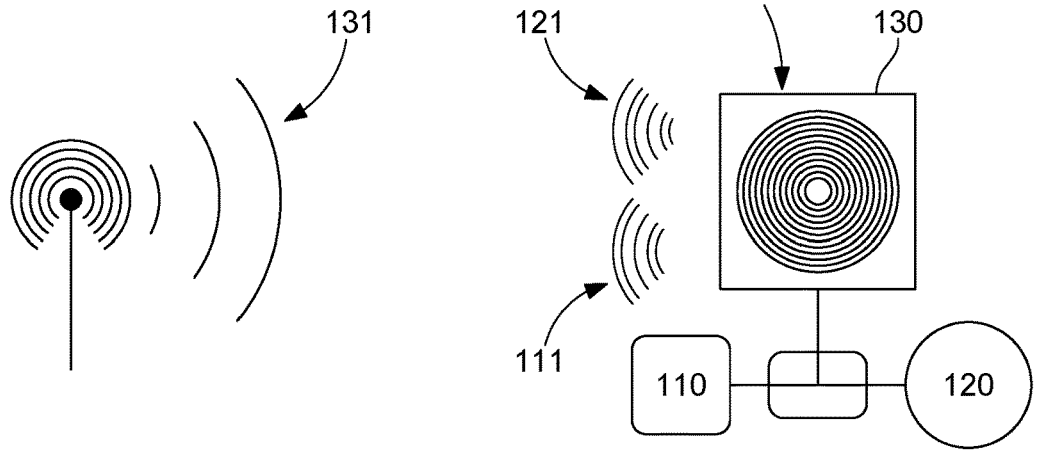
FIG. 1 shows a radiocommunication device 100 according to one embodiment.

FIG. 1 shows a schematic representation of a radiocommunication device 100 according to one embodiment. Said radiocommunication device 100 comprises an antenna 130, preferably said antenna 130 consists of a single antenna 130, configured to pick up at least one set of electromagnetic waves 131 and/or to radiate at least one first group of data 111 and/or at least one second group of data 121, as shown in the various figures. To this is added at least one first radiocommunication circuit 110, configured to receive said at least one set of electromagnetic waves 131 and/or to transmit said at least one first group of data 111, and at least one second radiocommunication circuit 120, configured to receive said at least one set of electromagnetic waves 131 and/or to transmit said at least one second group of data 121. It should be noted that said at least one set of electromagnetic waves 131 can comprise a request in the form of a group of data for example, to which, said at least one first radiocommunication circuit 110 responds by transmitting said at least one first group of data 111, and/or said at least one second radiocommunication circuit 120 responds by transmitting said at least one second group of data 121.

Moreover, an advantage of having an antenna 130, preferably a single antenna 130, and said at least one first radiocommunication circuit 110 and the at least one second radiocommunication circuit 120 is to be able to combine several functionalities in said radiocommunication device 100.

Indeed, said radiocommunication device 100 implements a communication method which allows the reception of said at least one set of electromagnetic waves 131, the selection of said at least one first radiocommunication circuit 110 and/or of said at least one second radiocommunication circuit 120; and the transmission of said at least one first group of data 111 and/or said at least one second group of data 121.

In the embodiment of FIG. 1, said antenna 130 can be connected, preferably directly, to said at least one first radiocommunication circuit 110 and to said at least one second radiocommunication circuit 120.

Indeed, said at least one first radiocommunication circuit 110 and said at least one second radiocommunication circuit 120 can share said antenna 130. Thus, said radiocommunication device 100 can allow to have at least two radiocommunication circuits 110, 120 connected to an antenna, preferably to a single antenna, which allows to simplify the manufacturing methods and/or to combine at least two radiocommunication circuits 110, 120 into a single RFID or NFC module.

Still in FIG. 1, said at least one first radiocommunication circuit 110 can transmit said at least one first group of data 111 according to at least one first standard and said at least one second radiocommunication circuit 120 can transmit said at least one second group of data 121 according to at least one second standard. Thus, the radiocommunication circuit 110, 120 only transmits a group of data 111, 121 when said at least one set of electromagnetic waves 131 corresponds to said at least one first standard and/or to said at least one second standard. For example, said at least one first standard may be of the type ISO15693 and said at least one second standard may be of the type ISO14443. It is also possible that said at least one first standard is an RFID standard or an NFC standard and/or said at least one second standard is an RFID standard or an NFC standard for example.

It is also possible that said at least one first standard and at least one second standard are identical, and respond more or less simultaneously, for example. In this case, the recipient of said at least one first group of data 111 and/or of said at least one second group of data 121 will select the group of data corresponding to his request. For example, said at least one first radiocommunication circuit 110 can provide access to certain parts of a building and said at least one second radiocommunication circuit 120 can serve as a means of payment within a company. Thus, when said antenna 130 picks up said at least one set of electromagnetic waves 131, said at least one first radiocommunication circuit 110 and said at least one second radiocommunication circuit 120 can respond to this request, and only the recipient will select the group of data correctly responding to his request from said at least one first group of data 111 and/or said at least one second group of data 121.

In the case where the two standards are different, said selection, mentioned above, is carried out by recognition of said at least one first standard by said at least one first radiocommunication circuit 110 and/or of said at least one second standard by said at least one second radiocommunication circuit 120. Thus, the radiocommunication device 100 operates using two different standards which avoids obstruction by a radiocommunication circuit 110, 120, whether this is said at least one first radiocommunication circuit 110 or said at least one second radiocommunication circuit 120, since each radiocommunication circuit 110, 120 only recognises interrogations and controls which correspond to its specific standard, for example.

Figure 2:
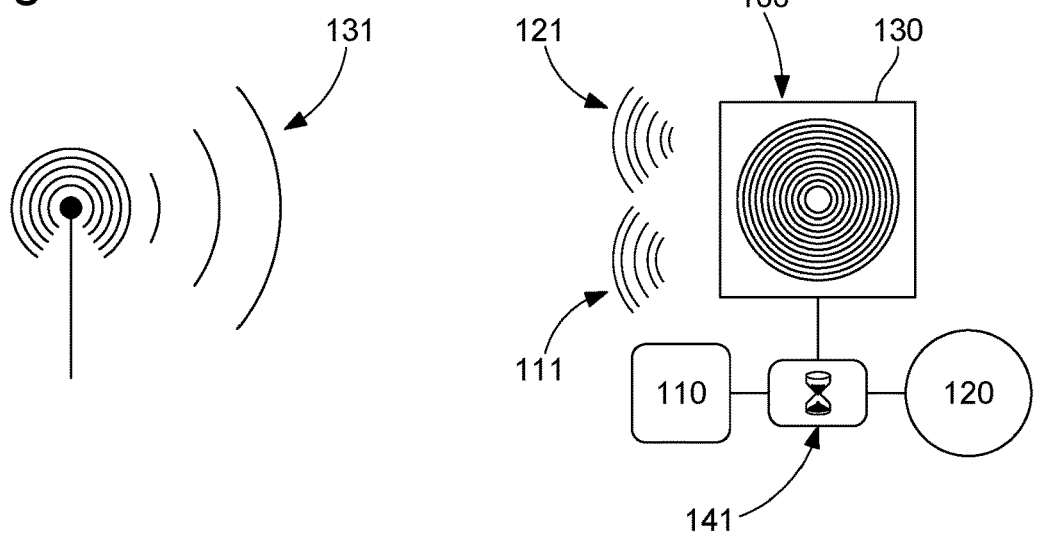
FIG. 2 illustrates a radiocommunication device 100 comprising at least one delay device 141 according to one embodiment; and, FIG. 3 shows a radiocommunication device 100 comprising at least one switch 142 according to one embodiment.

In the embodiment of FIG. 2, said radiocommunication device 100 comprises at least one delay device 141 configured to delay the reception of said at least one set of electromagnetic waves 131 by said at least one first radiocommunication circuit 110 or by said at least one second radiocommunication circuit 120. Said delay device may be in the form of a code line, for example, such as a loop, so that said selection is carried out by delaying said reception of said at least one set of electromagnetic waves 131 by said at least one first radiocommunication circuit 110 or by said at least one second radiocommunication circuit 120. Said at least one delay device 141 can also allow to delay said at least one first radiocommunication circuit 110 or said at least one second radiocommunication circuit 120, when said at least one first standard is identical to said at least one second standard for example, which will allow a better selection to the recipient.

It is also possible to consider that said selection is carried out by delaying said transmission of said at least one first group of data 111 and/or of said at least one second group of data 121. Thus, a prioritisation or hierarchisation between said at least one first radiocommunication circuit 110 and by said at least one second radiocommunication circuit 120 is carried out which prevents said at least one first radiocommunication circuit 110 and said at least one second radiocommunication circuit 120 from responding to the same interrogation at the same time for example.

Figure 3:
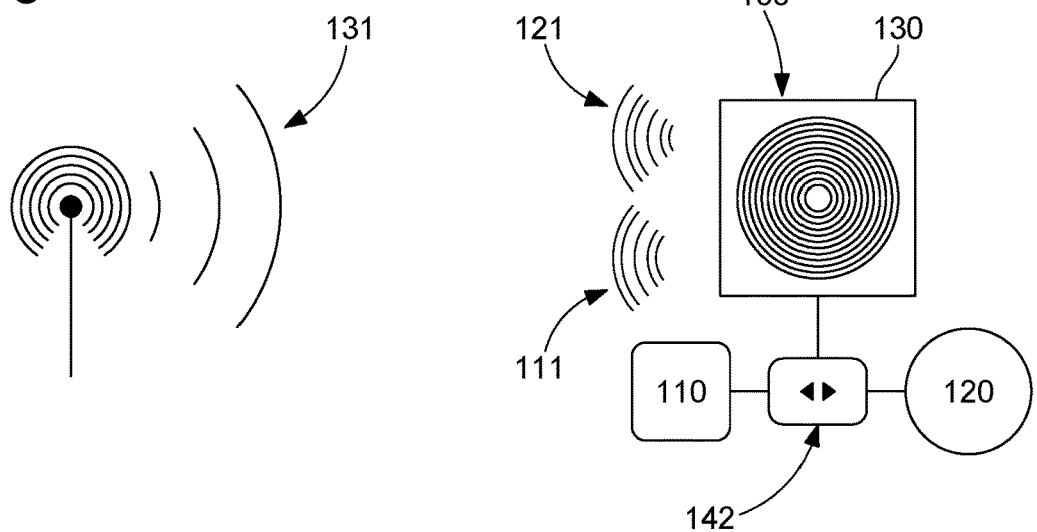

The embodiment of FIG. 3, in turn, presents said radiocommunication device 100 comprising at least one switch 142, for example a transistor or a set of transistors, configured to switch the reception of said at least one set of electromagnetic waves 131 between said at least one first radiocommunication circuit 110 and said at least one second radiocommunication circuit 120. This has the effect of performing said selection by switching, and therefore by activating for example, said reception of said at least one set of electromagnetic waves 131 between said at least one first radiocommunication circuit 110 and said at least one second radiocommunication circuit 120 and thus a prioritisation or hierarchisation between said at least one first radiocommunication circuit 110 and said at least one second radiocommunication circuit 120 is carried out.

The invention claimed is:

1. A radiocommunication device comprising:
   an antenna configured to receive at least one set of electromagnetic waves and/or to transmit at least one first group of data and/or at least one second group of data;
   at least one first radiocommunication circuit, said at least one first radiocommunication circuit being configured to receive said at least one set of electromagnetic waves and/or to transmit said at least one first group of data;
   at least one second radiocommunication circuit, said at least one second radiocommunication circuit being configured to receive said at least one set of electromagnetic waves and/or to transmit said at least one second group of data; and
   at least one delay device, the at least one delay device is configured to delay the reception of said at least one set of electromagnetic waves by said at least one first radiocommunication circuit or by said at least one second radiocommunication circuit,
   wherein the antenna is configured to be connected to said at least one first radiocommunication circuit and to said at least one second radiocommunication circuit,
   wherein the at least one first radiocommunication circuit is configured to receive the at least one first group of data according to at least one first standard and/or the at least one second radiocommunication circuit is configured to receive the at least one second group of data according to at least one second standard,
   wherein the antenna is configured to select by way of the delay device, said at least one first radio communication circuit by delaying a transmission of said at least one first group of data or is configured to select by way of the delay device, said at least one second radiocommunication circuit by delaying a transmission of said at least one second group of data.

2. The radiocommunication device according to claim 1, wherein said at least one first radiocommunication circuit is configured to transmit said at least one first group of data according to one of the at least one first standard and said at least one second radiocommunication circuit is configured to transmit said at least one second group of data according to one of the at least one second standard, said at least one first standard is different from said at least one second standard.

3. The radiocommunication device according to claim 2, wherein said at least one first standard is an RFID standard or an NFC standard and/or said at least one second standard is an RFID standard or an NFC standard.

4. The radiocommunication device according to claim 1, wherein said at least one first radiocommunication circuit is configured to transmit said at least one first group of data according to the at least one first standard and said at least one second radiocommunication circuit is configured to transmit said at least one second group of data according to the at least one second standard, wherein said at least one first standard is identical to said at least one second standard.

5. The radiocommunication device according to claim 1, wherein said antenna consists of a single antenna.

6. A communication method implemented by said radiocommunication device having an antenna configured to receive at least one set of electromagnetic waves and/or to transmit at least one first group of data and/or at least one second group of data, at least one first radiocommunication circuit, said at least one first radiocommunication circuit being configured to receive said at least one set of electromagnetic waves and/or to transmit said at least one first group of data, at least one second radiocommunication circuit, said at least one second radiocommunication circuit being configured to receive said at least one set of electromagnetic waves and/or to transmit said at least one second group of data, and at least one delay device configured to delay the reception of said at least one set of electromagnetic waves by said at least one first radiocommunication circuit or by said at least one second radiocommunication circuit, wherein the antenna is configured to be connected to said at least one first radiocommunication circuit and to said at least one second radiocommunication circuit, wherein the at least one first radiocommunication circuit is configured to receive the at least one first group of data according to at least one first standard and/or the at least one second radiocommunication circuit is configured to receive the at least one second group of data according to at least one second standard, said communication method comprising:
   receiving said at least one set of electromagnetic waves;
   selecting said at least one first radiocommunication circuit and/or said at least one second radiocommunication circuit; and transmitting said at least one first group of data and/or said at least one second group of data, wherein said selecting is performed by the antenna and is carried out by delaying with a delay device said transmitting of said at least one first group of data by the first radiocommunication circuit and/or by delaying with the delay device the transmitting of said at least one second group of data by the second radiocommunication circuit.

7. The communication method according to claim 6, wherein said at least one first radiocommunication circuit is configured to transmit said at least one first group of data according to the at least one first standard and said at least one second radiocommunication circuit is configured to transmit said at least one second group of data according to the at least one second standard, wherein said selection is carried out by recognition of said at least one first standard by said at least one first radiocommunication circuit and/or of said at least one second standard by said at least one second radiocommunication circuit.

\* \* \* \* \*